(12) United States Patent
Sugawara et al.

(10) Patent No.: US 8,441,911 B2
(45) Date of Patent: May 14, 2013

(54) OPTICAL DISC, AND PRODUCTION METHOD AND REPRODUCTION APPARATUS FOR OPTICAL DISC

(75) Inventors: Tadahiro Sugawara, Yamato (JP); Wataru Kuzuta, Yamato (JP); Atsuhisa Yamamoto, Yamato (JP); Fumitaka Tsuji, Yamato (JP)

(73) Assignees: Victor Creative Media Co., Ltd., Yamato-Shi, Kanagawa-Ken (JP); JVC Kenwood Corporation, Yokohama-Shi, Kanagawa-Ken (JP)

( * ) Notice: Subject to any disclaimer, the term of this patent is extended or adjusted under 35 U.S.C. 154(b) by 0 days.

(21) Appl. No.: 13/337,457

(22) Filed: Dec. 27, 2011

(65) Prior Publication Data

US 2012/0163151 A1   Jun. 28, 2012

(30) Foreign Application Priority Data

Dec. 28, 2010  (JP) .................................. 2010-293878

(51) Int. Cl.
*G11B 7/24* (2006.01)
*G11B 7/00* (2006.01)

(52) U.S. Cl.
USPC .................. 369/275.4; 369/275.3; 369/53.21; 347/224

(58) Field of Classification Search .................. 369/274, 369/275.1–275.5, 59.25, 59.23, 53.21, 100; 347/224, 225; 428/64.1–64.4; 430/320, 430/321
See application file for complete search history.

(56) References Cited

U.S. PATENT DOCUMENTS

| 5,843,626 | A | * | 12/1998 | Ohta et al. | 430/320 |
| 5,876,823 | A | | 3/1999 | Nagashima | |
| 7,869,340 | B2 | * | 1/2011 | Honda et al. | 369/275.3 |
| 2007/0269652 | A1 | * | 11/2007 | Kubo | 428/332 |
| 2008/0002015 | A1 | * | 1/2008 | Itoga et al. | 347/224 |
| 2009/0233036 | A1 | * | 9/2009 | Kuroda et al. | 428/64.4 |
| 2009/0279416 | A1 | * | 11/2009 | Kubo | 369/284 |
| 2010/0149943 | A1 | * | 6/2010 | Kuroda et al. | 369/100 |
| 2010/0149944 | A1 | * | 6/2010 | Kuroda et al. | 369/100 |
| 2010/0245530 | A1 | * | 9/2010 | Itoga et al. | 347/247 |
| 2010/0277561 | A1 | * | 11/2010 | Miles et al. | 347/253 |

FOREIGN PATENT DOCUMENTS

JP    10-162437    6/1998

* cited by examiner

*Primary Examiner* — Thang Tran
(74) *Attorney, Agent, or Firm* — Renner, Kenner, Greive, Bobak, Taylor & Weber

(57) ABSTRACT

An optical disc has a data layer including a data-layer substrate made of a transparent material and a data-layer reflection film formed on an upper side of the data-layer substrate, a display layer including a display-layer substrate having a display pattern and a display-layer reflection film formed on a lower side of the display-layer substrate, and an intermediate layer made of a transparent material provided between an upper side of the data layer and a lower side of the display layer.

The data- and display-layer reflection films exhibit specific reflectivity to allow the display pattern to be visible from a lower side of the data-layer substrate through the data-layer reflection film.

15 Claims, 12 Drawing Sheets

|  | SINGLE-LAYER DVD | | DUAL-LAYER DVD | |
|---|---|---|---|---|
|  | REFLECTIVITY(STANDARD) | MATERIAL | REFLECTIVITY(STANDARD) | MATERIAL |
| SECOND-LAYER(L1) REFLECTION FILM |  |  | 24% [18~30%] | Al |
| FIRST-LAYER(L0) REFLECTION FILM | 63% [45~85%] | Al | 24% [18~30%] | Ag |

| | REFLECTIVITY | MATERIAL |
|---|---|---|
| DISPLAY-LAYER(L1) REFLECTION FILM | 24% OR LOWER | Al |
| DATA-LAYER(L0) REFLECTION FILM | ABOUT 50% | Ag |

OPTICAL DISC, AND PRODUCTION METHOD AND REPRODUCTION APPARATUS FOR OPTICAL DISC

CROSS-REFERENCE TO RELATED APPLICATIONS

This application is based on and claims the benefit of priority from the prior Japanese Patent Application No. 2010-293878 filed on Dec. 28, 2010, the entire content of which is incorporated herein by reference.

BACKGROUND OF THE INVENTION

The present invention relates to an optical disc having a pattern or design being displayed on the data-storing area side, and a production method and a reproduction apparatus for the optical disc.

In general, optical discs, such as compact discs (CD), digital versatile discs (DVD) and blu-ray discs (BD), have a label on one side by printing, the opposite of the side for data retrieving by an optical pickup.

There is a known technique to put a label on part of the data retrieving side by printing or pit art to form a pit pattern, in double-sided optical discs.

However, there is no technique to display a pattern in an area in which data is stored, on the data retrieving side.

SUMMARY OF THE INVENTION

A purpose of the present invention is to provide an optical disc in which a pattern is displayed so that it is visible through a data layer in which data is stored, and a production method and a reproduction apparatus for the optical disc.

The present invention provides an optical disc comprising: a data-layer substrate made of a transparent material; a data-layer reflection film formed on an upper side of the data-layer substrate; a display-layer substrate having a display pattern; a display-layer reflection film formed on a lower side of the display-layer substrate; and an intermediate layer made of a transparent material provided between an upper side of a data layer having the data-layer substrate and the data-layer reflection film, and a lower side of a display layer having the display-layer substrate and the display-layer reflection film, wherein the data- and display-layer reflection films exhibit specific reflectivity to allow the display pattern to be visible from a lower side of the data-layer substrate through the data-layer reflection film.

Moreover, the present invention provides a method of producing an optical disc comprising the steps of: forming a display-pattern forming section on a stamper, a display pattern being to be formed in the display-pattern forming section, the display pattern being provided to an optical disc to be produced to have a data-layer substrate made of a transparent material and a data-layer reflection film formed on an upper side of the data-layer substrate and to have a display-layer substrate having a display pattern and a display-layer reflection film formed on a lower side of the display-layer substrate, the display pattern being visible from a lower side of the data-layer substrate through the data-layer reflection film; forming the display-layer substrate by applying injection molding to the stamper having the display-pattern forming section with an injected transparent material; forming the display-layer reflection film formed on the lower side of the display-layer substrate; forming the data-layer reflection film on the upper side of the data-layer substrate, wherein the data-layer reflection film is formed so that the data- and display-layer reflection films exhibit specific reflectivity to allow the display pattern to be visible from a lower side of the data-layer substrate through the data-layer reflection film; and forming an intermediate layer made of a transparent material between an upper side of a data layer having the data-layer substrate and the data-layer reflection film, and a lower side of a display layer having the display-layer substrate and the display-layer reflection film.

Furthermore, the present invention provides a reproduction apparatus for reproducing data from an optical disc comprising: a reproducing unit configured to reproduce data from an optical disc having: a data-layer substrate made of a transparent material; a data-layer reflection film formed on an upper side of the data-layer substrate; a display-layer substrate having a display pattern; and a display-layer reflection film formed on a lower side of the display-layer substrate, wherein the data- and display-layer reflection films exhibit specific reflectivity to allow the display pattern to be visible from a lower side of the data-layer substrate through the data-layer reflection film.

BRIEF DESCRIPTION OF DRAWINGS

FIG. 2 is a table that lists reflectivity and materials of reflection films in known dual-layer DVDs;

FIG. 3 is a table that lists reflectivity and materials of reflection films in the optical disc 1, the embodiment of optical disc according to the present invention;

DETAILED DESCRIPTION OF PREFERRED EMBODIMENTS

Figure 1:
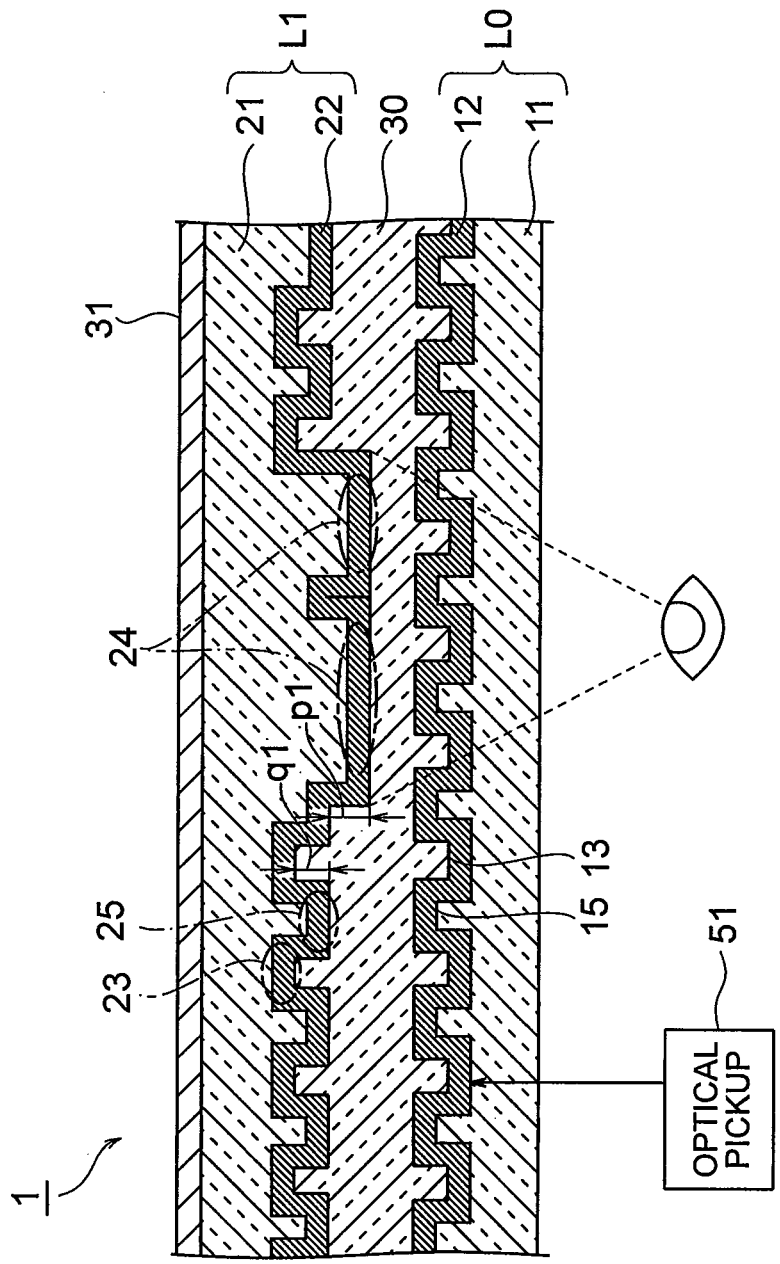
FIG. 1 is a schematic cross sectional view of an optical disc 1, an embodiment of optical disc according to the present invention.

Embodiments of an optical disc, a production method and a reproduction apparatus according the present invention will be explained with reference to the attached drawings.

Throughout the drawings, the same reference numerals or signs are given to the same or analogous elements. The cross sectional drawings are a schematic view drawn not to scale, with elements not to scale relative to each other, such as a ratio in thickness of one layer to another and a ratio of a thickness to a length for layers in one drawing and among the drawings, preferable scales and ratios being understood through the following description.

Described below are preferred embodiments of the present invention with the structure, material, shape, size, steps being not limited to the description, within the scope of the present invention. For example, an optical disc described below may be a single- or double-sided disc as far as it has a pattern or design being displayed on the data-storing area side.

It is a precondition in the following description that, as an example, an optical disc 1 is composed of a data layer (11 and 12) that is a layer L0, an intermediate layer 30, a display layer (21 and 22) that is a layer L1, and a print layer 31, from the bottom to top when the optical disc 1 is placed in parallel with a horizontal plane (, or the optical disc 1 is viewed through its cross section.). Therefore, it is a precondition in the following description that, as an example, the optical disc 1 has its data retrieving side (the data read-out side) on the bottom when the optical disc 1 is viewed through its cross section. Moreover, in the following description under the precondition explained above: a height is defined for a section that sticks out towards the upper direction even if it is a concave section in cross sectional views; and a depth is defined for a section that sticks out towards the lower direction even if it is a convex section, in the cross sectional views.

(Optical Disc)

As shown in FIG. 1, an optical disc 1 according to an embodiment of optical disc of the present invention is an optical storage medium including: a data layer (11 and 12) that is a layer L0, having data stored which can be read out by an optical pickup 51; and a display layer (21 and 22) that is a layer L1, having a display pattern 24 that can be viewed through the data layer (11 and 12).

The display pattern 24 forms a certain design that can be viewed from the data retrieving side of the optical disc 1 through a data-layer reflection film formed in the data layer (11 and 12), which will be described below.

The data layer (11 and 12) has a data-layer substrate 11 having data recorded with recording pits 13 formed thereon and a data-layer reflection film 12 formed on the data-layer substrate 11. The upper surface of the data layer (11 and 12), except for the area where the recording pits 13 are formed, are flat land sections 15.

The display layer (21 and 22) has a display-layer substrate 21 having, at its lower side, the dummy pits 23 and the display pattern 24 formed thereon and a display-layer reflection film 22 formed on the lower side of the display-layer substrate 21. The lower surface of the display layer (21 and 22), except for the area where the dummy pits 23 and the display pattern 24 are formed, are flat land sections 25. The data-layer substrate 11 and the display-layer substrate 21 are made of a transparent material, such as polycarbonate.

The optical pickup 51 emits a laser beam having, for example, a wavelength of 650 nm, to the optical disc 1 and detects a return beam from the data-layer reflection film 12, to read out data stored in the data layer (11 and 12).

In general, as shown in FIG. 2, a single-layer DVD has a reflection film that is made of alumina (Al) and exhibits standard reflectivity in the range from 45% to 85%, for example. Also as shown in FIG. 2, generally, a dual-layer DVD has a first-layer(L0) reflection film that is made of silver (Ag) and exhibits standard reflectivity in the range from 18% to 30% and a second-layer(L1) reflection film that is made of Al and exhibits standard reflectivity in the range from 18% to 30%, for example.

The optical disc 1 in this embodiment is produced with a single-layer recording format having the single data layer (11 and 12). However, as shown in FIG. 3, Ag is used for the data layer reflection film 12 so that the display pattern 24 formed on the display layer (21 and 22) can be viewed from the lower (data read-out) side of the optical disc 1 through the data layer (11 and 12). Moreover, the data-layer reflection film 12 is formed having a specific thickness so that the reflection film 12 exhibits a reflectivity in the range from about 45% to 60%, preferably from about 45% to 55%, and more preferably about 50% so that the display pattern 24 can be viewed through the data layer (11 and 12), within the standard reflectivity in the range from 45% to 85% for a single-layer disc.

The material and the percentage values of reflectivity described above and shown in FIG. 3 are just an example. The data-layer reflection film 12 can be made of any material with any thickness so that the reflection film 12 can exhibit a specific reflectivity to allow the display pattern 24 to be viewed through the data layer (11 and 12).

Accordingly, the data-layer reflection film 12 can be any semi-transparent film that, at least, allows part of visible light to pass therethrough but reflects part of a laser beam emitted from the optical pickup 51. Nevertheless, the material and the percentage values of reflectivity described above and shown in FIG. 3 are more appropriate for the data-layer reflection film 12 to allow the display pattern 24 to be viewed through the data layer (11 and 12).

The display-layer reflection film 22 of the display layer (21 and 22) is made of Al or the like. The display-layer reflection film 22 is formed having a thickness to exhibit the reflectivity of high reflectivity close to 100%. However, an adjustment is made to the data-layer reflection film 12 so that the display-layer reflection film 22 exhibits the reflectivity of 24% or lower, as shown in FIG. 3, enough for the display pattern 24 to be visible through the data-layer reflection film 12. The adjustment made to the data-layer reflection film 12 will be described later.

The dummy pits 23 formed in the display layer (21 and 22) may be random pits having a spiral or concentric shape with no regularity or continuity so as to cause diffused reflection and diffraction of incident light. The display pattern 24 can be viewed, for example, due to the contrast between the area of the dummy pits 23 and the area with no dummy pits 23 being formed. The dummy pits 23 formed having the spiral or concentric shape to cause diffused reflection serve to reduce glare caused by reflected beams on the display pattern 24 when the display pattern 24 is viewed, compared to if the display pattern 24 is formed on the surface on which specular reflection occurs with no dummy pits 23 formed. Therefore, high contrast is achieved for the display pattern 24 to improve visibility. Nevertheless, the dummy pits 23 may not be formed if a relatively low contrast is allowed. Moreover, the dummy pits 23 may have a standard length for DVD, BD, etc. that can be formed by conventional equipment. It is not a requirement for the dummy pits 23 whether or not they can be read out by the optical pickup 51.

The data layer (11 and 12) and the display layer (21 and 22) are stuck to each other with an intermediate layer 30 made of a transparent material such as ultraviolet curable resin interposed therebetween. Formed on the upper surface of the optical disc 1 is a print layer 31 having a label surface on which a label is printed, for example.

As described above, the optical disc 1 has the data-layer reflection film 12 in the data layer (11 and 12) recorded with a single-layer disc format, that is formed with a particular material having the thickness adjusted to exhibit specific reflectivity so that the display pattern 24 of the display layer (21 and 22) can be viewed from the data-retrieving side through the data layer (11 and 12).

Since, the optical disc 1 is produced having the display pattern 24 viewable through the data layer (11 and 12), it is extremely difficult to make fake products of the optical disc 1, including the display pattern 24, by ordinary ripping software, for example. It is also possible to distinguish between the regular optical disc 1 of the embodiment and fake products by visual inspection of the display pattern 24, thus preventing forgery.

Moreover, the embodiment of optical disc gives a beautiful data read-out surface to the optical disc 1 because the optical disc 1 is produced having the display pattern 24 viewable through the data layer (11 and 12). Furthermore, information related to the content of data can be displayed with the display pattern 24 so that the optical disc 1 can be identified from the data retrieving side.

(Method of producing Optical Disc 1)

Figure 4:
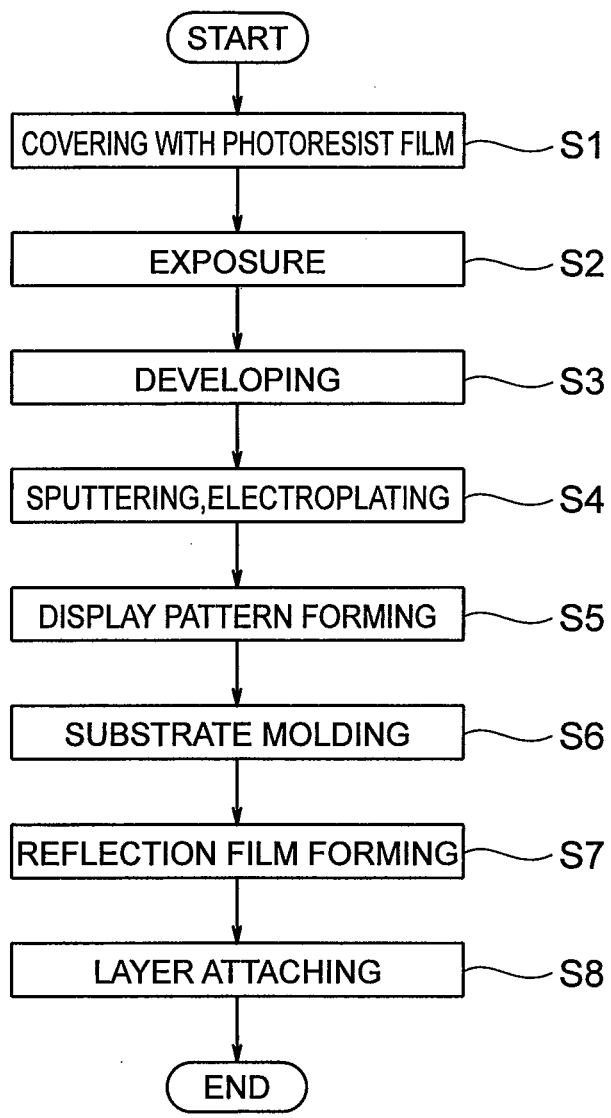
FIG. 4 is a flow chart for explaining an embodiment of a method of producing the optical disc 1, the embodiment of optical disc according to the present invention.
Figure 5A:
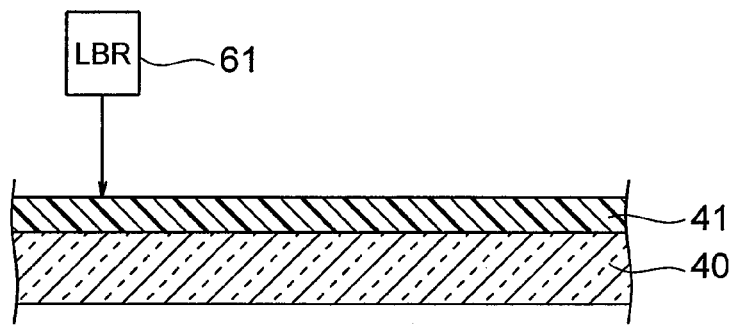
FIG. 5A is a schematic cross sectional view showing one step of the method of producing the optical disc 1, the embodiment of optical disc according to the present invention.
Figure 5B:
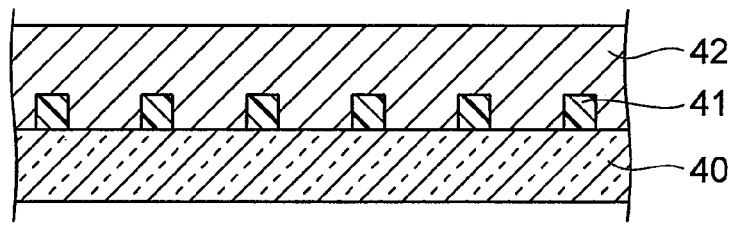
FIG. 5B is a schematic cross sectional view showing one step of the method of producing the optical disc 1, the embodiment of optical disc according to the present invention.
Figure 5C:
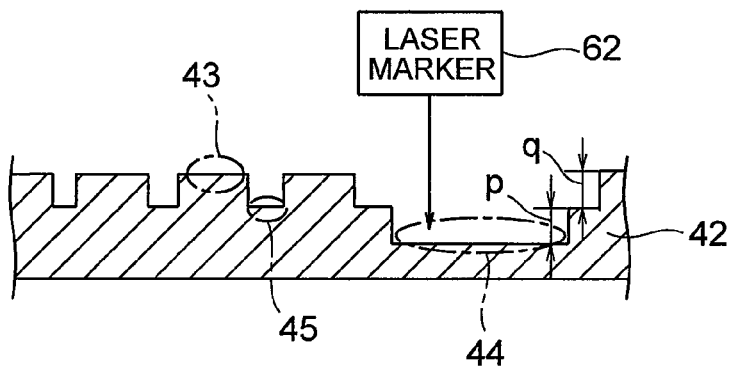
FIG. 5C is a schematic cross sectional view showing one step of the method of producing the optical disc 1, the embodiment of optical disc according to the present invention.
Figure 5D:
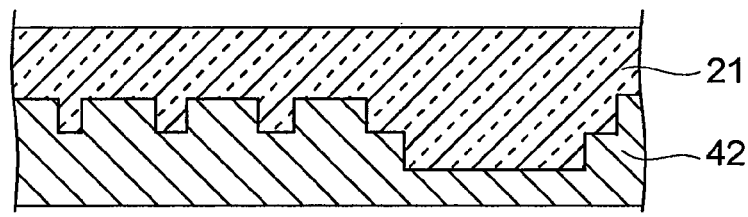
FIG. 5D is a schematic cross sectional view showing one step of the method of producing the optical disc 1, the embodiment of optical disc according to the present invention.
Figure 5E:
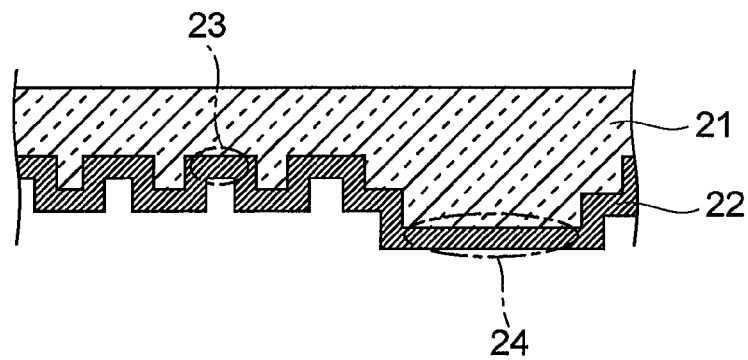
FIG. 5E is a schematic cross sectional view showing one step of the method of producing the optical disc 1, the embodiment of optical disc according to the present invention.
Figure 5F:
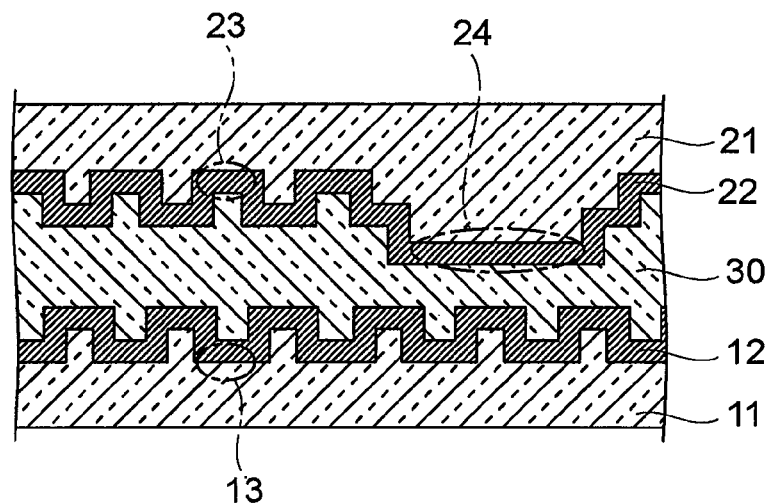
FIG. 5F is a schematic cross sectional view showing one step of the method of producing the optical disc 1, the embodiment of optical disc according to the present invention.

Described next is an embodiment of method of producing the optical disc 1, with respect a flow chart of FIG. 4 and also sectional views of FIGS. 5A to 5F, with explanation of the details of the optical disc 1. FIGS. 5A and 5B show a glass substrate 40 at the lower side. FIG. 5C shows a stamper 42 at the lower side. FIGS. 5D to 5F show the display layer 21 at the upper side. In FIG. 5C, a depth p and a height q are defined with a land forming section 45 as a reference plane. In this connection, in FIG. 1, a depth p1 and a height q1 are defined with the land sections 25 as a reference plane.

Firstly, as shown in FIG. 5A, in step S1, the glass substrate 40 is applied with a photoresist solution by spin coating followed by baking so that it is coated with a photoresist film 41. Next, in step S2, the photoresist film 41 undergoes an exposure process (laser cutting) by a laser beam recorder (LBR) 61 so that a pit pattern of the dummy pits 23 is formed thereon. Then, in step S3, the photoresist film 41 is developed with a developing solution so that the exposed area of the photoresist film 41 is selectively removed. Through this process, a master disc is produced having the glass substrate 40 and the remaining sections of the photoresist film 41 after the selective removal.

Next, as shown in FIG. 5B, in step S4, a thin film of nickel (Ni) is formed on the exposed area of the photoresist film 41 of the master disc by sputtering, for example, followed by electroplating of Ni, thus producing the stamper 42. The material to be used for the thin film and electroplating may not necessarily be Ni and any suitable material can be used. The stamper 42 is then peeled off from the master disc.

Next, as shown in FIG. 5C, in step S5, the stamper 42 is exposed to a laser beam having a long wavelength from a laser marker 62 equipped with a YAG, $YVO_4$, $CO_2$ laser, etc. Through this process, a pattern to be displayed (the display pattern 24) is marked on a pit forming section 43 that forms the dummy pits 23 of the display-layer substrate 21 (not shown), thus providing a display-pattern forming section 44 that forms the display pattern 24 of the display-layer substrate 21.

Although not clearly shown in FIG. 5C (that is not drawn to scale), a value of the depth p of the display-pattern forming section 44 from a land-forming section 45 that forms the land sections 25 is adjusted to be larger than a value of the height q of the pit forming section 43 from the land-forming section 45. For example, the depth p of the display-pattern forming section 44 can be set to about 1000 nm and the height q of the pit forming section 43 can be set to about 120 nm. The depth p and the height q correspond to the depth p1 of the display pattern 24 and the height q1 of the dummy pits 23 (FIG. 1), respectively. The depth p and the depth p1 are adjusted to an almost same value. The height q and the height q1 are also adjusted to an almost same value. Therefore, the depth p1 of the display pattern 24 is adjusted to a value larger than that of the height q1 of the dummy pits 23, although not clearly shown in FIG. 1 (that is not drawn to scale).

Next, as shown in FIG. 5D, in step S6, the stamper 42 is applied with an injected transparent material, such as polycarbonate resin, to have the display-layer substrate 21 formed thereon by injection molding. The display-layer substrate 21 is then peeled off from the stamper 42.

Next, as shown in FIG. 5E, in step S7, the display-layer substrate 21 undergoes sputtering on the surface having the dummy pits 23 and the display pattern 24 formed thereon. Through this process, a metal, such as Al, is formed on the display-layer substrate 21 so as to become the display-layer reflection film 22 that exhibits high reflectivity close to 100%. The display-layer substrate 21 and the display-layer reflection film 22 then constitute the display layer (21 and 22).

Then, as shown in FIG. 5F, in step S8, using the intermediate layer 30 made of ultraviolet curable resin, the display layer (21 and 22) and the data layer (11 and 12) prepared having the data-layer reflection film 12 made of Ag or the like in another process are stuck to each other, with printing or the like on the display layer (21 and 22), thus completing the production of the optical disc 1. In step S8, the thickness of the data-layer reflection film 12 is adjusted to exhibit the reflectivity of about 50% so that the display-layer reflection film 22 exhibits the reflectivity of about 24% or lower.

As described above, the display pattern 24 of the optical disc 1 is formed having the depth p1, the value of which is larger than the value of the height q1 of the dummy pits 23, thus exhibiting high contrast and high visibility.

(Noise Reduction Process)

Although it is an option, it is preferable to apply a noise reduction process to the optical disc 1, which is described with reference to FIGS. 6 and 7.

Figure 6:
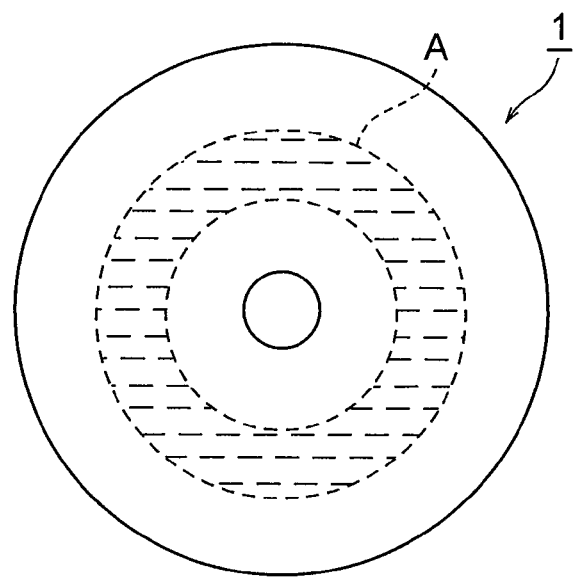
FIG. 6 is a schematic plan view of the optical disc 1 having a concentric-circular display area (a hatched area)
Figure 7:
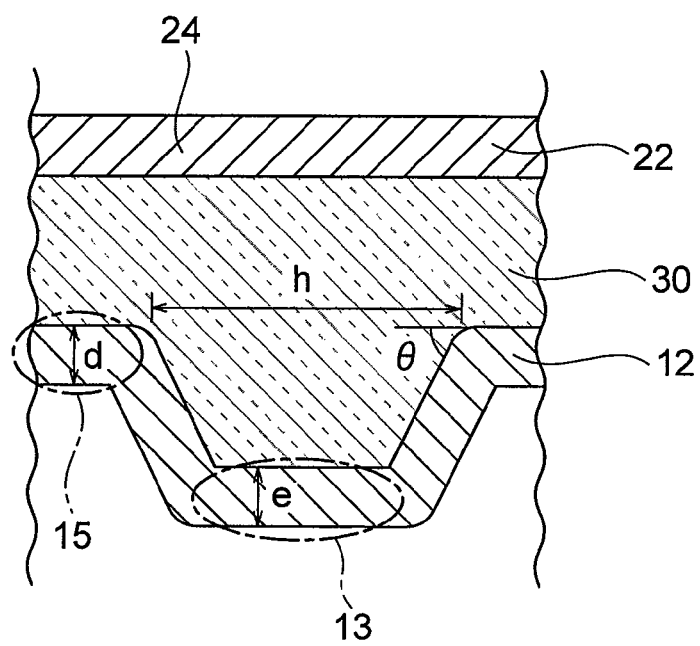
FIG. 7 is schematic cross sectional view of the optical disc 1 having recording pits.

Shown in FIG. 6 is a plan view of the optical disc 1 having the display pattern 24, for example, formed within a concentric-circular display area A (a hatched area) of the display layer (21 and 22). The noise reduction process may be applied to a specific area of the data layer (11 and 12) over which the display area A is superimposed when viewed from above in the cross section of FIG. 1, to reduce a return beam from the display-layer reflection film 22, which is turned to be an optical noise. It is preferable to apply the noise reduction process to make least the adverse effect of noises to jitters in reproduction of the optical disc 1.

The noise reduction process is applied to the area in which the display pattern 24 formed on the display layer (21 and 22) is visible through the data layer (11 and 12). It is a precondition in FIG. 6 that the display pattern 24 has a single design in the display area A, so that, as if the display area A is painted over with a single color, for example.

One technique for the noise reduction process is explained with reference to FIG. 7. In a specific area of the data-layer substrate 11 which is superimposed over the display area A (when viewed from below in the cross section of FIG. 1), the recording pits 13 are formed into a particular shape having an opening with a wider width h or a larger angle of inclination 8 close to 90 degrees than the other area of the data-layer substrate 11 with no superimposition over the display area A. The width h or the angle of inclination 8 is adjusted to allow a larger amount of Ag to be sputtered to become the data-layer reflection film 12. The data-layer reflection film 12 made of a larger amount of Ag exhibits a lower transmittance to reduce return beams from the display-layer reflection film 22, hence reducing optical noises. As described above, the recording pits 13 formed into different shapes between the area over which the display area A is superimposed and the other area on the data-layer substrate 11 allow better data reproduction.

Another technique for the noise reduction process is to apply a material (a transmittance reducing layer) that exhibits a low transmittance to a beam emitted from the optical pickup 51 on a specific area of the data-layer reflection film 12 which is superimposed over the display area A (when viewed from below in the cross section of FIG. 1). The material that exhibits a low transmittance to a beam emitted from the optical pickup 51 may be a metal such as Al. The material is provided on the data-layer reflection film 12 by sputtering or the like while an area of the reflection film 12, except for the specific area superimposed over the display area A, is being masked. Such a material that exhibits a low transmittance to a beam emitted from the optical pickup 51 may be an adhesive or the like.

Still, another technique for the noise reduction process may be thickening the specific area of the data-layer reflection film 12 which is superimposed over the display area A. Furthermore, a transmittance reducing layer described above may be provided under the display-layer reflection film 22 in the cross section of FIG. 1.

A further technique for the noise reduction process may be applying an anti-reflection (AR) coating to the display area A of the display-layer reflection film 22 to reduce the reflection of light having the wavelength of a beam emitted by the optical pickup 51. The AR coating may be roughening the surface of the display-layer reflection film 22 with a reagent to reduce reflected light beams to the optical pickup 51, thus reducing optical noises.

As described above, higher-quality data reproduction can be achieved with the reduction of reflected light beams to the optical pickup 51 by the noise reduction process, such as: applying a layer of material that exhibits a low transmittance to a beam emitted from the optical pickup 51 on a specific area of the data-layer reflection film 12 which is superimposed over the display area A; or by adjusting the thickness of the data-layer reflection film 12 between the area superimposed over the display area A and the other area not superimposed over the display area A.

Still, a further technique for the noise reduction process is to adjust the depth p (FIG. 5C) of the display-pattern forming section 44 to give the intermediate layer 30 the thickness of 70 μm or more in the area over which the display pattern 24 is superimposed in the cross section of FIG. 1, which also reduces reflected light beams to the optical pickup 51, thus reducing optical noises.

(Reproduction Apparatus for Optical Disc 1)

Described next is a first embodiment of reproduction apparatus according to the present invention that can control the retrieval (reproduction) of data from the optical disc 1 (FIG. 1) through the display pattern 24.

Figure 8:
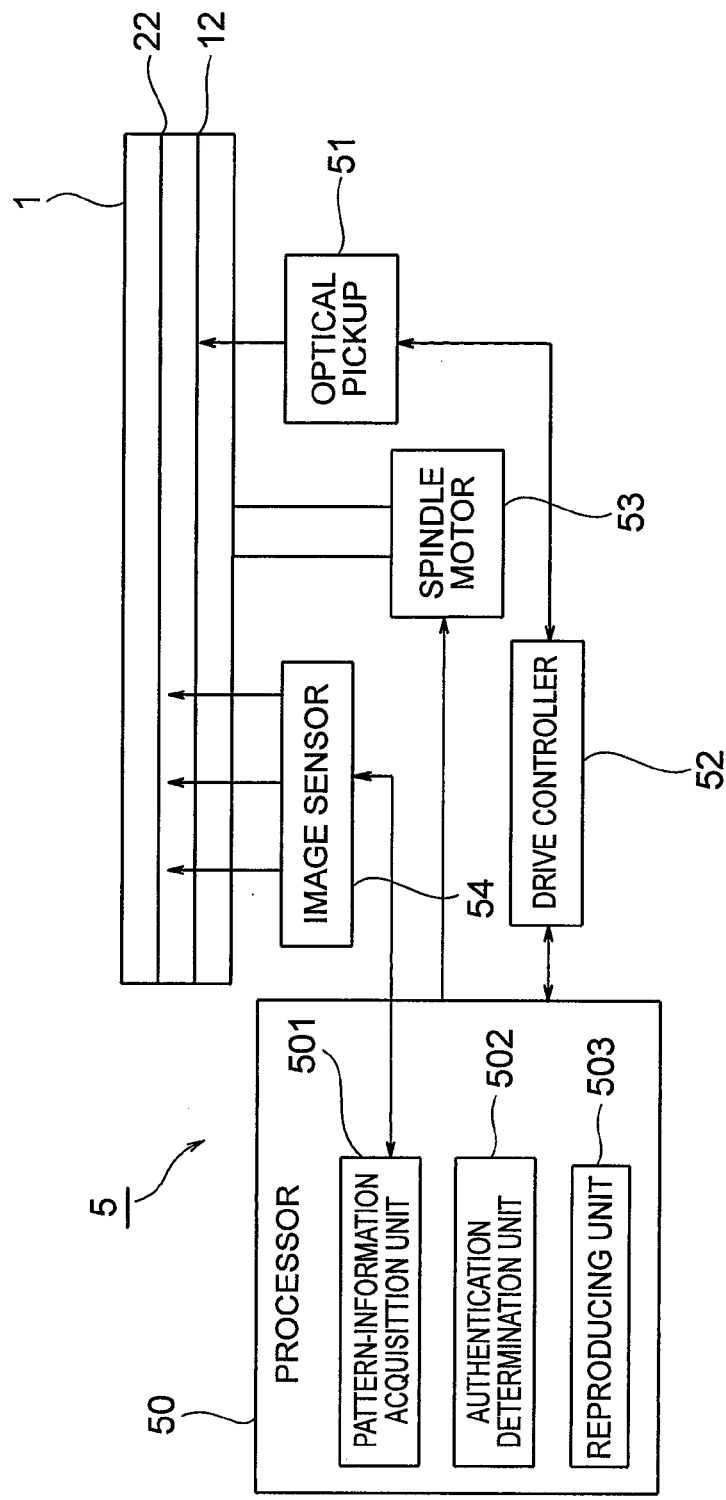
FIG. 8 is a block diagram of a reproduction apparatus 5 for the optical disc 1, a first embodiment of reproduction apparatus according to the present invention.

As shown in FIG. 8, a reproduction apparatus 5 of the first embodiment of reproduction apparatus is provided with: an optical pickup 51; a drive controller 52 for controlling the drive of the optical pickup 51; a spindle motor 53 for rotating the optical disc 1; an image sensor 54 for picking up an image of the display pattern 24 formed on the display layer (21 and 22) via the data layer (11 and 12); and a processor 50 for controlling several operations of the reproduction apparatus 5. The processor 50 is equipped with a pattern-information acquisition unit 501, an authentication determination unit 502, and a reproducing unit 503.

The drive controller 52 controls the optical mechanism of the optical pickup 51 and also controls an actuator (not shown) to move the optical pickup 51 in the radius direction of the optical disc 1 for varying the data retrieval position on the optical disc 1.

The image sensor 54 may be a CCD liner image sensor provided on a straight line that goes through a rotary axis of the optical disc 1 and parallel to the optical disc 1. The image sensor 54 may be provided to be movable in the radius direction of the optical disc 1. Moreover, the image sensor 54 may be a CCD or CMOS area image sensor for picking up an image of the display pattern 24 while the optical disc 1 is stationary.

Figure 9:
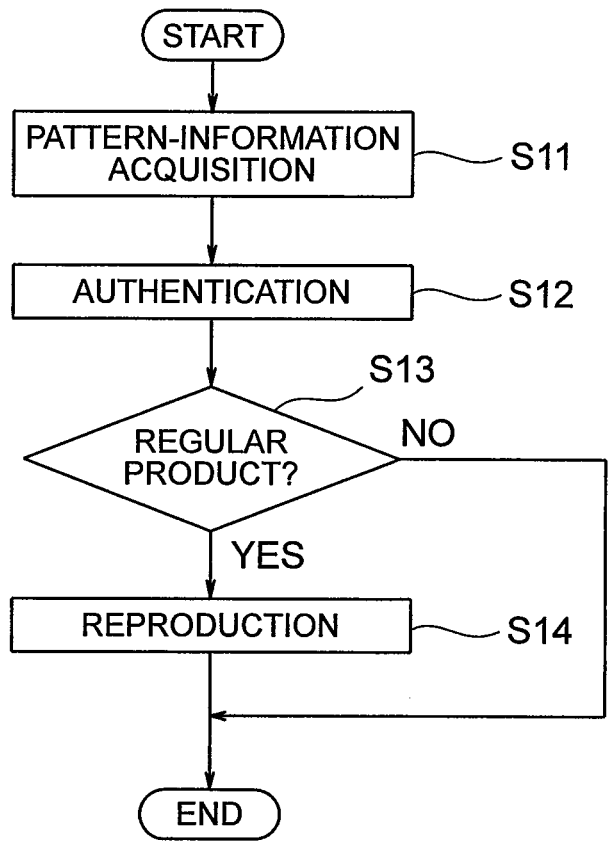
FIG. 9 is a flow chart for explaining an operation of the reproduction apparatus 5, the first embodiment of reproduction apparatus according to the present invention.

An exemplary operation of the reproduction apparatus 5 is described with reference to a flow chart of FIG. 9.

Firstly, in step S11: the image sensor 54 is rotated by the spindle motor 53 to scan the display pattern 24 of the optical disc 1 which is illuminated with light from a light source (not shown) and pick up an image of the pattern 24 via the data layer (11 and 12) under control by the pattern-information acquisition unit 501; then, the acquisition unit 501 acquires pattern information that is image information of the display pattern 24.

Next, in step S12, the authentication determination unit 502 verifies the pattern information acquired by the pattern-information acquisition unit 501 against authentication information pre-stored in the determination unit 502, to perform an authentication process to the optical disc 1.

Following to step S12, the authentication determination unit 502 determines whether the optical disc 1 is a regular product or not, depending on the result of the authentication process, in step S13.

If the verification of the pattern information is positive so that the authentication determination unit 502 determines that the optical disc 1 is a regular product (YES in step S13), in step S14, the reproducing unit 503 controls the optical pickup 51 via the drive controller 52 to retrieve data stored in the data layer (21 and 22) while the optical disc 1 is being rotated by the spindle motor 53. When the data stored in the data layer (21 and 22) is time-series data such as voices or moving pictures, the reproducing unit 503 performs processes necessary for the reproduction of time-series data. Then, the operation ends.

If the verification of the pattern information is negative so that the authentication determination unit 502 determines that the optical disc 1 is not a regular product (NO in step S13), the operation ends.

The block diagram of the processor 50 shows the pattern-information acquisition unit 501, the authentication determination unit 502, and the reproducing unit 503, as functional blocks. The units may be configured with a single hardware component such as a processing unit or respective hardware components.

As described above, according to the reproduction apparatus 5 (the first embodiment of reproduction apparatus), the reproduction of data from the optical disc 1 (the embodiment of optical disc) is allowed only if the verification of the display pattern 24 is positive, thus the production of fake products of the optical disc 1 being prevented.

Moreover, the display pattern 24 of the optical disc 1 can be formed with a laser beam of the laser marker 62 (FIG. 5C) or the like at a higher quality than by offset or gravure printing. Therefore, the accuracy of authentication process to the optical disc 1 is enhanced with the display pattern 24.

(Variation to Optical Disc 1)

Described next is a variation to the optical disc 1. An optical disc 1a, the variation to the optical disc 1, has the same disc structure as the optical disc 1 shown in FIG. 1. The same elements of the optical disc 1a as those of the optical disc 1 are given the same reference numerals or signs with the description thereof being omitted.

Figure 10:
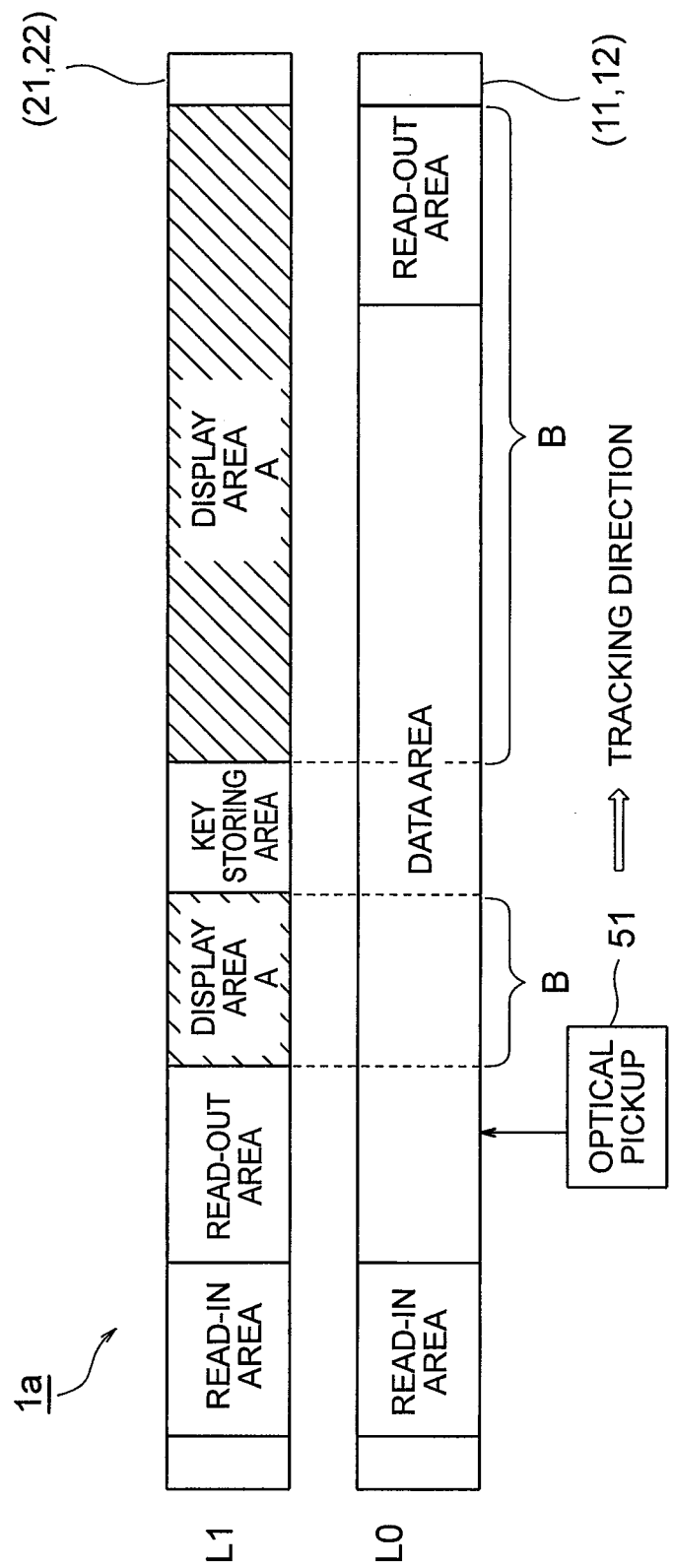
FIG. 10 is view showing a data format of an optical disc 1a, a variation to the optical disc 1 that is the embodiment of optical disc according to the present invention.

A feature of the optical disc 1a lies in data formats of the data layer (11 and 12) that is a layer L0 and the display layer (21 and 22) that is a layer L1, as shown in FIG. 10, that allows data retrieval from a specific section of the display layer (21 and 22) by the optical pickup 51.

As shown in FIG. 10, for example, from the internal circumference side of the optical disc 1a, the display layer (21 and 22) of the optical disc 1a is provided with: a read-in area; a read-out area; a display area A that stores the display pattern 24 and the concave and convex shapes of the dummy pits 23 (FIG. 1); and a key storing area that is part of the display area A but apart from the read-out area and stores key information to be used for an authentication process to the optical disc 1a. Stored in the read-in area is key location information that indicates the location of the key storing area on the display layer (21 and 22). The key storing area allows tracking scanning. Each area is formed into a doughnut shape in this variation. The read-in area may be provided outside the display area A and the key storing area, from the internal circumference side, that is the external circumference side of the optical disc 1a.

Moreover, as shown in FIG. 10, for example, from the internal circumference side, the data layer (11 and 12) that is a layer L0 of the optical disc 1a is provided with: a read-in area; a data area; and a read-out area. Data to be stored in the data layer (11 and 12) is encrypted by an encryption technique that allows decryption with the key information stored in the key storing area of the display layer (21 and 22).

The data-layer reflection film 12 of the optical disc 1a is made of a metal, such as Ag, that exhibits the reflectivity in the range from 18% to 30%.

The optical disc 1a may be applied with the noise reduction process described above for the optical disc 1 to reduce optical noises caused by the display pattern 24 of the display layer (21 and 22). For example, the shape of the recording pits 13 (FIG. 1) of the data layer (11 and 12) may be adjusted for reducing optical noises in an area B over which the display area A of the display layer (21 and 22) is superimposed in FIG. 10.

As described, above, the optical disc 1a of the variation is provided with the display area A, formed in which are the dummy pits 23 (FIG. 1) that has no regularity or continuity, such as random pits having a spiral or concentric shape so as to cause diffused reflection and diffraction of incident light. Thus, the display area A does not allow tracking scanning by an ordinary optical pickup. Therefore, it is extremely difficult to make fake products of the optical disc 1a, including the key information stored in the key storing area, by ordinary ripping software, for example. Accordingly, the production of fake products of the optical disc 1a can be prevented.

Moreover, the optical disc 1a of the variation is provided with the display pattern 24 viewable through the data layer (11 and 12), and hence it is extremely difficult to make fake products of the optical disc 1a, including the display pattern 24, by ordinary ripping software, for example. It is also possible to distinguish between regular optical disc 1a and fake products by visual inspection of the display pattern 24, thus preventing forgery.

Moreover, the variation to the embodiment of optical disc gives a beautiful data read-out surface to the optical disc 1a because the optical disc 1a is produced having the display pattern 24 viewable through the data layer (11 and 12). Furthermore, information related to the content of data can be displayed with the display pattern 24 so that the optical disc 1a can be identified from the data retrieving side.

(Reproduction Apparatus for Optical Disc 1a)

Described next is a second embodiment of reproduction apparatus according to the present invention that can control the retrieval (reproduction) of data from the optical disc 1a (FIG. 10).

Figure 11:
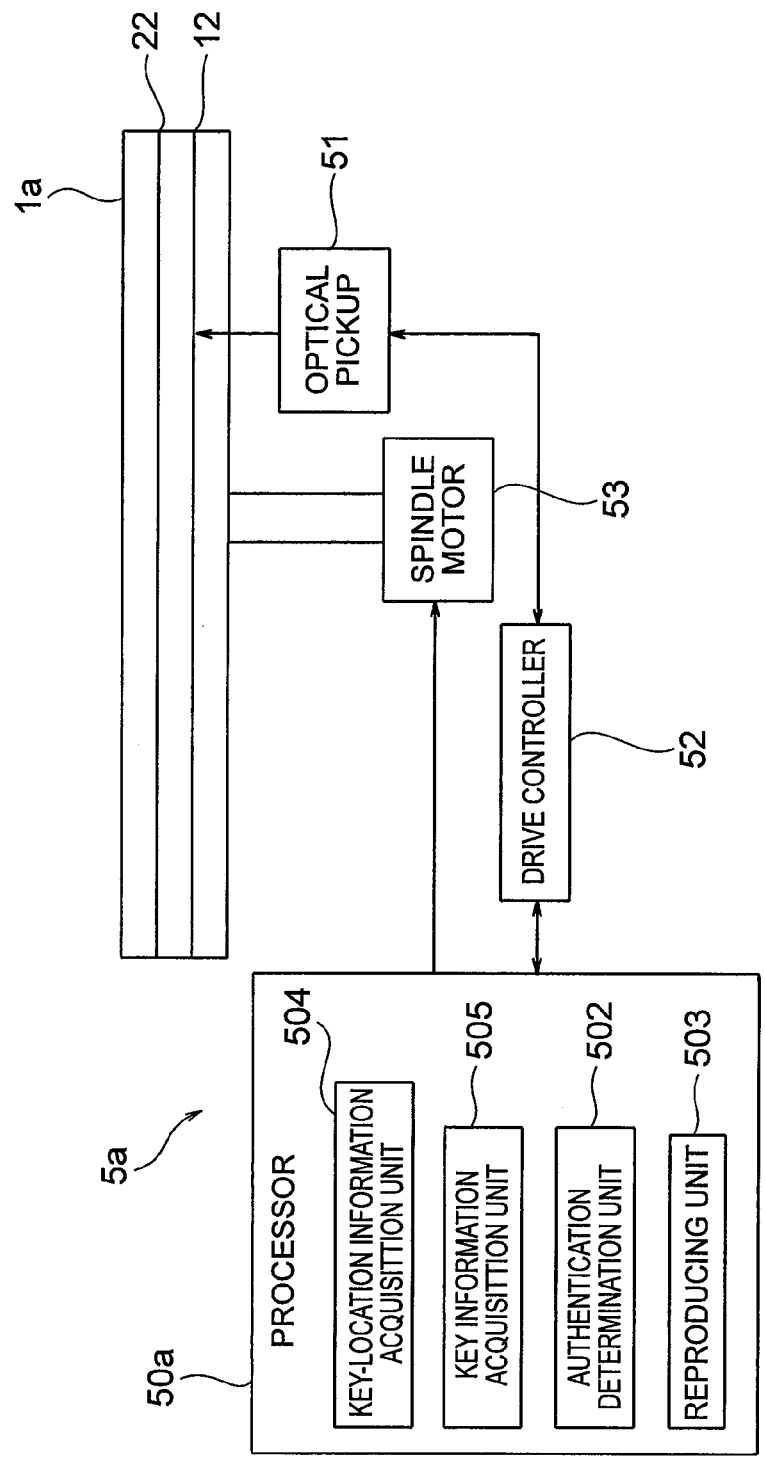
FIG. 11 is a block diagram of a reproduction apparatus 5a for the optical disc 1a, a second embodiment of reproduction apparatus according to the present invention.

Compared to the reproduction apparatus 5 (FIG. 8), as shown in FIG. 11, a reproduction apparatus 5a (the second embodiment of reproduction apparatus) for the optical disc 1a of the variation, is not provided with the image sensor 54. Moreover, a processor 50a of the reproduction apparatus 5a is provided with a key-location information acquisition unit 504 and a key information acquisition unit 505 instead of the pattern-information acquisition unit 501. The other elements of the reproduction apparatus 5a shown in FIG. 11 are identical to those shown in FIG. 8 and given the same reference numerals.

Figure 12:
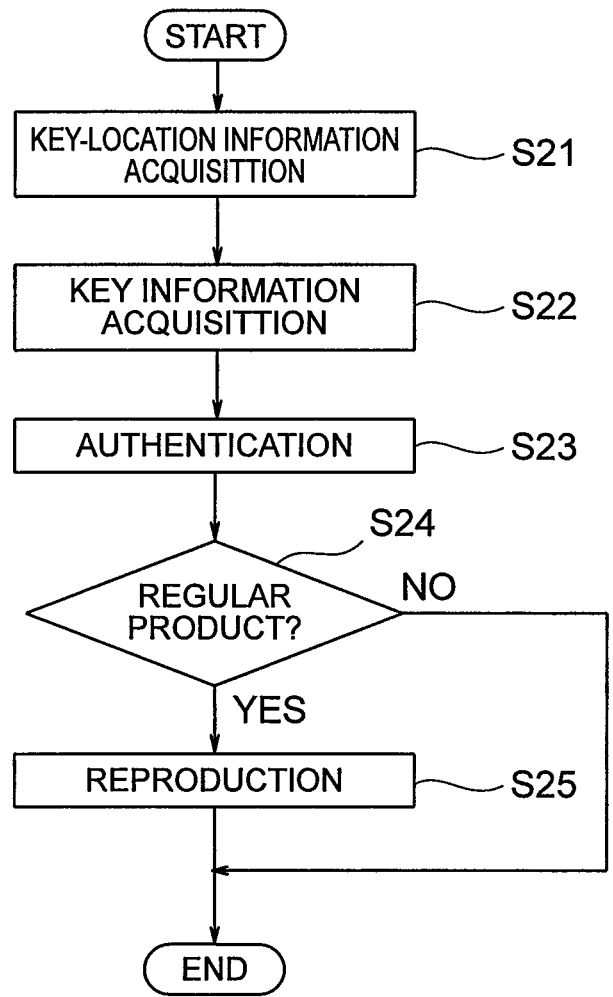
FIG. 12 is a flow chart for explaining an operation of the reproduction apparatus 5a, the second embodiment of reproduction apparatus according to the present invention.

An exemplary operation of the reproduction apparatus 5a is described with reference to a flow chart of FIG. 12.

Firstly, in step S21, the key-location information acquisition unit 504 controls the drive of the optical pickup 51 via the drive controller 52 to acquire key location information (the location of key on the radius of the optical disc 1a, an address of the key, etc.) from the read-in area of the display layer (21 and 22) of the optical disc 1a (FIG. 10).

Next, in step S22, the key information acquisition unit 505 moves the optical pickup 51 via the drive controller 52 to the key storing area of the optical disc 1a based on the key location information acquired by the key-location information acquisition unit 504 to acquire the key information from the key storing area.

Then, in step S23, the authentication determination unit 502 verifies the key information acquired by the key information acquisition unit 505 against authentication information pre-stored in the determination unit 502, to perform an authentication process to the optical disc 1a.

Following to step S23, the authentication determination unit 502 determines whether the optical disc 1a is a regular product or not, depending on the result of the authentication process, in step S24.

If the verification of the key information is positive so that the authentication determination unit 502 determines that the optical disc 1a is a regular product (YES in step S24), in step S25, the reproducing unit 503 controls the optical pickup 51 via the drive controller 52 to retrieve data encrypted and stored in the data layer (21 and 22) while the optical disc 1a is being rotated by the spindle motor 53. Then, the key information acquisition unit 505 decrypts the encrypted data with the acquired key information to reproduce the data. Then, the operation ends.

If the verification of the key information is negative so that the authentication determination unit 502 determines that the optical disc 1a is not a regular product (NO in step S24), the operation ends.

The block diagram of the processor 50a shows the key-location information acquisition unit 504, the key information acquisition unit 505, the authentication determination unit 502, and the reproducing unit 503, as functional blocks. The units may be configured with a single hardware component such as a processing unit or respective hardware components.

As described above, according to the reproduction apparatus 5a (the second embodiment of reproduction apparatus) for the optical disc 1a (the variation), the information that indicates the location of the key storing area that has stored the key information is retrieved and the then the optical pickup 51 moves to the location of the key storing area. Therefore, it is possible to retrieve the key information stored in the key storing area that is put into (surrounded by) the display area A (FIG. 10) having the random dummy pits 23 (FIG. 1) having a spiral or concentric shape with no regularity or continuity formed therein so that tracking scanning by an ordinary optical pickup is not allowed.

Moreover, as described above, according to the reproduction apparatus 5a (the second embodiment of reproduction apparatus), the reproduction of data from the optical disc 1a (the variation of optical disc) is allowed only if the verification of the key information stored in part of the display pattern area is positive and then the reproduction is performed with decryption of the data using the key information. Therefore, the production of fake products of the optical disc 1a is prevented.

(Other Variations)

In the embodiment of optical disc, the display pattern 24 (FIG. 1) may be formed with an image code. In this case, a code reader is used as the image sensor 54 shown in FIG. 8. The image code may be: a two-dimensional code, such as data matrix, QR code, PDF417, Maxi code, and Veri code; a one-dimensional code, such as JAN, ITF, CODE39, NW-7, and CODE128; or a stack bar code, such as a five-dimensional code in which one-dimensional codes are stacked like a two-dimensional code.

The key information may be stored in the display pattern 24 and data encrypted with an encryption code that is decodable with the key information may be stored in the data layer (11 and 12).

In the embodiment of optical disc and its variation, the display area A of the display layer (21 and 22) may be formed to be visible by so-called pit art with spread dummy bits 23. The bit art to the display area A may be performed entirely by CAV (Constant Angular Velocity) recording so that a display pattern formed with the bit art can be scanned by an optical pickup.

A pattern may be formed on the stumper 42 without the pit forming section 43 by the laser marker 62 (FIG. 5C) so that the display pattern 24 can be formed on the display-layer substrate 21 that allows specular reflection, with no dummy pits 23 provided in the display layer (21 and 22).

Not only by the laser marker 62, the display pattern 24 may be: formed by etching to a masked stamper 42; formed into a hologram on the photoresist film 41 caused by the interference due to irradiation of a reference beam and a beam of a specific pattern; or formed into a pattern achieved with the combination of these techniques.

The authentication information to be stored in the authentication determination unit 502 of the reproduction apparatus 5 (FIG. 8) or 5a (FIG. 11) may be provided to the determination unit 502 over a network.

The display-layer reflection film 22 and the data-layer reflection film 12 (FIG. 1) may be made of an alloy including a metal such as Al or Ag, as far as the display pattern 24 is visible through the data layer (11 and 12) and data stored in the optical disc 1 or 1a can be retrieved by the optical pickup 51.

The optical discs 1 (the embodiment) and 1a (the variation) described above are a ROM disc, such as DVD-ROM and BD-ROM, in which data has been stored by means the recording bits 13 (FIG. 1). Not only that, the present invention is applicable to: a write-once disc, such as DVD-R and BD-R; and a rewritable disc, such as DVD-RW and BD-RE. In order to apply the present invention to the write-once or rewritable disc, in FIG. 1, a recording film including pigment or a phase-change material is provided between the data-layer substrate 11 and the data-layer reflection film 12, with grooves formed in the data-layer substrate 11. Data is stored in the recording film with a mark formed by a laser, instead of the recording pits 13.

As described above, according to the present invention, a pattern can be displayed in an optical disc, which is visible through a data layer on which data is stored.

It is further understood by those skilled in the art that the foregoing description is a preferred embodiment of the disclosed device or method and that various changes and modifications may be made in the invention without departing from the sprit and scope thereof.

What is claimed is:

1. An optical disc comprising:
a data-layer substrate made of a transparent material;
a data-layer reflection film formed on an upper side of the data-layer substrate;
a display-layer substrate having a display pattern;
a display-layer reflection film formed on a lower side of the display-layer substrate; and
an intermediate layer made of a transparent material provided between an upper side of a data layer having the data-layer substrate and the data-layer reflection film, and a lower side of a display layer having the display-layer substrate and the display-layer reflection film,
wherein the data-layer reflection film and display-layer reflection film exhibit specific reflectivity to allow the display pattern to be visible from a lower side of the data-layer substrate through the data-layer reflection film.

2. The optical disc according to claim 1, wherein the display-layer substrate has dummy pits.

3. The optical disc according to claim 2, wherein
each dummy pit has a convex section that sticks out towards an upper side of the display-layer substrate from the lower side, and
the display pattern has a convex section that sticks out towards the lower side of the display-layer substrate from the upper side,
wherein the convex section of each dummy pit has a height in a direction of the upper side of the display-layer substrate and the convex section of the display pattern has a depth in a direction of the lower side of the display-layer substrate, the depth having a larger value than the height.

4. The optical disc according to claim 1, wherein the display-layer substrate has a display area that includes the display pattern and the data layer has a first area over which the display area is superimposed in a direction of the upper side of the data-layer substrate, the first area being applied with a noise reduction process to reduce return beams from the display-layer reflection film.

5. The optical disc according to claim 4, wherein the data layer has a second area over which the display area is not superimposed and the first area and the second area have first recording pits and second recording pits, respectively, each pit having an opening in the direction of the upper side of the data-layer substrate, the opening of each first recording pit being wider than the opening of each second recording pit or the opening of each first recording pit having a larger angle of inclination than the opening of each second recording pit in a direction of the lower side of the data-layer substrate.

6. The optical disc according to claim 1, wherein the display-layer substrate includes:
a display area having the display pattern;
a key recording area having key information stored therein, the key information being used for reproducing data stored in the data layer, the key recording area being provided as part of the display area; and
a read-in area having key location information stored therein, the key location information indicating a location of the key recording area on the display-layer substrate, the read-in area being provided in an internal or external circumference side of the optical disc.

7. The optical disc according to claim 1, wherein
the data-layer reflection film is a semi-transparent film that, at least, allows part of visible light to pass therethrough, and
the display-layer reflection film exhibits lower reflectivity than the data-layer reflection film.

8. A method of producing an optical disc comprising the steps of:
forming a display-pattern forming section on a stamper, a display pattern being to be formed in the display-pattern forming section, the display pattern being provided to an optical disc to be produced to have a data-layer substrate made of a transparent material and a data-layer reflection film formed on an upper side of the data-layer substrate and to have a display-layer substrate having a display pattern and a display-layer reflection film formed on a lower side of the display-layer substrate, the display pattern being visible from a lower side of the data-layer substrate through the data-layer reflection film;
forming the display-layer substrate by applying injection molding to the stamper having the display-pattern forming section with an injected transparent material;
forming the display-layer reflection film formed on the lower side of the display-layer substrate;
forming the data-layer reflection film on the upper side of the data-layer substrate, wherein the data-layer reflection film is formed so that the data-layer reflection film and display-layer reflection film exhibit specific reflectivity to allow the display pattern to be visible from a lower side of the data-layer substrate through the data-layer reflection film; and
forming an intermediate layer made of a transparent material between an upper side of a data layer having the data-layer substrate and the data-layer reflection film, and a lower side of a display layer having the display-layer substrate and the display-layer reflection film.

9. The method of producing an optical disc according to claim 8, wherein a pit forming section for forming recording pits are formed on the stamper, the display pattern being formed in an area of the stamper in which the pit forming section is formed.

10. The method of producing an optical disc according to claim 8, wherein
the data-layer reflection film is formed into a semi-transparent film that, at least, allows part of visible light to pass therethrough, and
the display-layer reflection film is formed so as to exhibit lower reflectivity than the data-layer reflection film.

11. A reproduction apparatus for reproducing data from an optical disc comprising: an optical disc; and
a reproducing unit configured to reproduce data from the optical disc, wherein the optical disc having:
a data-layer substrate made of a transparent material;
a data-layer reflection film formed on an upper side of the data-layer substrate;
a display-layer substrate having a display pattern; and
a display-layer reflection film formed on a lower side of the display-layer substrate,
wherein the data-layer reflecting film and display-layer reflection film exhibit specific reflectivity to allow the display pattern to be visible from a lower side of the data-layer substrate through the data-layer reflection film.

12. The reproduction apparatus according to claim 11 further comprising:
an image sensor configured to pick up an image of the display pattern from the lower side of the data-layer substrate; and
a processor configured to control reproduction of the data based on the image picked up by the image sensor.

13. The reproduction apparatus according to claim 12, wherein the processor stores authentication information to verify the image picked up by the image sensor against the authentication information and allows the reproducing unit to reproduce the data from the optical disc only if the verification is positive.

14. The reproduction apparatus according to claim 11, wherein the display-layer substrate includes:
a display area having a display pattern;
a key recording area having key information stored therein, the key information being used for reproducing data stored in the data layer; and
a read-in area having key location information stored therein, the key location information indicating a location of the key recording area on the display-layer substrate,
the reproduction apparatus further comprising:
a processor configured to retrieve key information from the key recording area and control reproduction of the data based on the key information.

15. The reproduction apparatus according to claim 14, wherein the processor stores authentication information to verify the key information retrieved from the key recording area against the authentication information and allows the reproducing unit to reproduce the data from the optical disc only if the verification is positive.

* * * * *